(12) United States Patent
Redondo Ferrero et al.

(10) Patent No.: US 10,841,274 B2
(45) Date of Patent: Nov. 17, 2020

(54) FEDERATED VIRTUAL DATACENTER APPARATUS

(71) Applicant: HEWLETT PACKARD ENTERPRISE DEVELOPMENT LP, Houston, TX (US)

(72) Inventors: Miguel Redondo Ferrero, Las Rozas (ES); Hrushikesh Gangur, Sunnyvale, CA (US); Nayana Dawalbhakta, Sunnyvale, CA (US); Ignacio Aldama, Las Rozas (ES); Chegu Vinod, Sunnyvale, CA (US); Vinay Saxena, Plano, TX (US); Wei Wei, Palo Alto, CA (US); Enrique Matorras Agro-Martin, Las Rozas (ES)

(73) Assignee: Hewlett Packard Enterprise Development LP, Houston, TX (US)

( * ) Notice: Subject to any disclaimer, the term of this patent is extended or adjusted under 35 U.S.C. 154(b) by 142 days.

(21) Appl. No.: 15/774,269

(22) PCT Filed: Feb. 8, 2016

(86) PCT No.: PCT/EP2016/052648
§ 371 (c)(1),
(2) Date: May 7, 2018

(87) PCT Pub. No.: WO2017/137067
PCT Pub. Date: Aug. 17, 2017

(65) Prior Publication Data
US 2018/0332001 A1 Nov. 15, 2018

(51) Int. Cl.
*G06F 15/16* (2006.01)
*H04L 29/12* (2006.01)
(Continued)

(52) U.S. Cl.
CPC ...... *H04L 61/2015* (2013.01); *G06F 9/45558* (2013.01); *H04L 12/4633* (2013.01);
(Continued)

(58) Field of Classification Search
CPC ................. H04L 61/2015; H04L 12/4633
(Continued)

(56) References Cited

U.S. PATENT DOCUMENTS

2011/0238793 A1* 9/2011 Bedare ................. H04L 45/586
709/220
2014/0301192 A1 10/2014 Lee et al.
(Continued)

FOREIGN PATENT DOCUMENTS

| EP | 3070887 A1 | 9/2016 |
|---|---|---|
| WO | WO-2015085523 A1 | 6/2015 |
| WO | WO-2015123849 A1 | 8/2015 |

OTHER PUBLICATIONS

International Search Report and Written Opinion, International Application No. PCT/EP2016/052648, dated Oct. 10, 2016, pp. 1-13, EPO.

(Continued)

*Primary Examiner* — Duyen M Doan

(57) ABSTRACT

Examples of federated virtual datacenter apparatus are described. In an example, at least two virtual datacenter instances are provided in respective different network broadcast domains and an overlay network encompasses the respective different broadcast domains. An Internet Protocol (IP) address manager assigns IP addresses network devices associated with the plurality of virtual datacenter instances so as to avoid IP address conflicts between virtual datacenter instances.

18 Claims, 4 Drawing Sheets

(51) Int. Cl.
*G06F 9/455* (2018.01)
*H04L 12/46* (2006.01)
*H04L 12/715* (2013.01)

(52) U.S. Cl.
CPC .......... *H04L 12/4641* (2013.01); *H04L 45/64* (2013.01); *H04L 61/2046* (2013.01); *G06F 2009/45562* (2013.01); *G06F 2009/45595* (2013.01)

(58) Field of Classification Search
USPC .................................................. 709/203, 245
See application file for complete search history.

(56) References Cited

U.S. PATENT DOCUMENTS

| | | | | |
|---|---|---|---|---|
| 2015/0124823 A1* | 5/2015 | Pani | ........................ | H04L 41/12 370/392 |
| 2015/0163192 A1* | 6/2015 | Jain | ........................ | H04L 43/04 370/255 |
| 2015/0281036 A1* | 10/2015 | Sun | ..................... | H04L 43/0829 370/248 |
| 2015/0312208 A1* | 10/2015 | Chatterjee | ........... | H04L 12/4641 709/245 |
| 2015/0317169 A1 | 11/2015 | Sinha et al. | | |
| 2015/0363219 A1 | 12/2015 | Kasturi et al. | | |
| 2016/0105392 A1* | 4/2016 | Thakkar | .............. | H04L 61/2038 709/220 |
| 2016/0294728 A1* | 10/2016 | Jain | ........................ | H04L 47/82 |

OTHER PUBLICATIONS

NTT Communications, "Virtualized Data Center Using Openstack and Openflow," Abstract, Apr. 2012, 1-page (online), Retrieved from the Internet on Dec. 31, 2015 at URL: <opennetsummit.org/archives/apr12/site/pdf/ntt.pdf>.

* cited by examiner

FEDERATED VIRTUAL DATACENTER APPARATUS

BACKGROUND

Rather than maintaining a physical datacenter, many enterprises have, or are in the process of, virtualizing their datacenter facilities. One motivation for such virtualisation is that resources in the cloud, whether public or private, can be used. Many physical aspects of such cloud resources can be independently managed in an efficient manner for parallel use by multiple enterprises.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

A virtual datacenter is able to divide a physical datacenter into well-defined containers called tenants, each tenant having a corresponding group of users. OpenStack® is an example of a technology for implementing a virtual datacenter. An OpenStack® instance manages access by the tenants to hardware pools of processing, storage and networking resources. Each tenant may have one or more associated virtual machines.

In certain circumstances, it is desirable to allow connection between different virtual datacenter instances. Such connection is challenging because quotas are not shared, networks are not shared and Classless Internet Domain Routing (CIDR) ranges and IP addresses can easily repeat. For example, within a single OpenStack® instance, a virtual machine connected to a broadcast domain has visibility to all other virtual machines within the same broadcast domain within the same OpenStack® instance and no IP address conflicts arise, but if there is more than one OpenStack® instance then IP address assignments may conflict because the data IP address assignments between OpenStack® instances are not federated.

In certain examples, there is provided a system in which multiple virtual datacenter instances are federated, that is that there is a common management encompassing the multiple datacenter instances. At least two of the multiple virtual datacenter instances are in different network broadcast domains. To allow communication between virtual datacenter instances in different network broadcast domains, an overlay network is provided that encapsulates layer 2 messages within layer 3 messages for transmission from an address in one network broadcast domain to an address in another network broadcast domain. A layer 2 message is directed by switches in the data link layer to destinations determined by a destination Media Access Control (MAC) address. A layer 3 message is routed to a destination IP address via a layer 3 router.

In an example, an IP address manager is provided to assign IP addresses to network devices associated with the plurality of virtual datacenter instances. The IP address manager is arranged to assign IP addresses so as to avoid IP address conflicts between virtual datacenter instances. In this way, network addressing is federated across the plurality of virtual datacenter instances.

Figure 1:
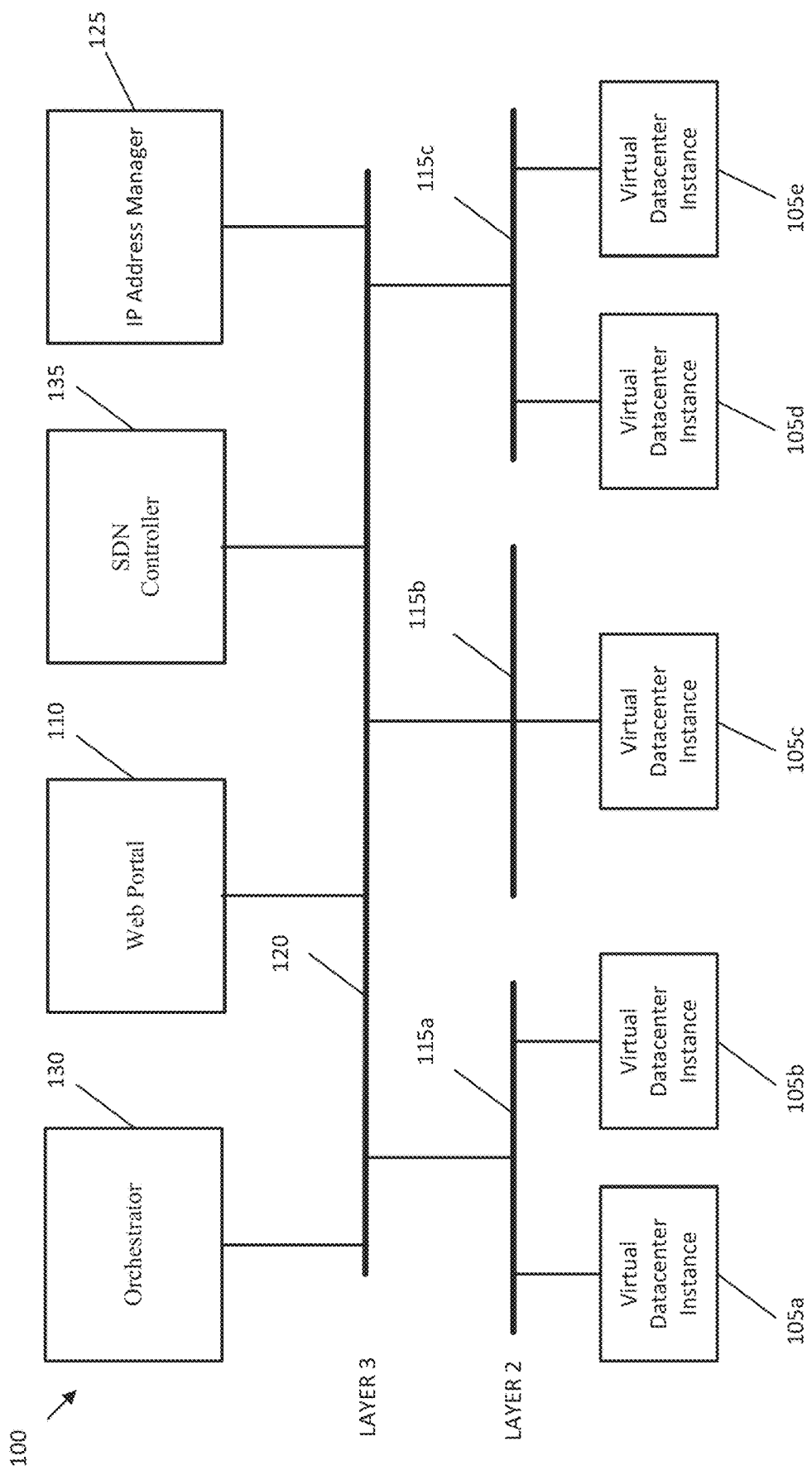
FIG. 1 schematically shows the main components of a federated virtual datacenter according to an example.

FIG. 1 schematically shows an example of a system 100 in which the assignment of IP addresses is federated across multiple broadcast domains to avoid IP address conflicts. As shown, a plurality of virtual datacenter instances 105a to 105e, collectively referred to hereafter as virtual datacenter instances 105, are accessible by at least one user, for example a business enterprise, via a web portal 110. The virtual datacenter instances each have at least one virtual machine. In examples, the virtual datacenter instances are OpenStack® instances.

OpenStack® divides a virtual datacenter into well-defined almost isolated containers called tenants (or projects). OpenStack® virtualizes and divides into pieces datacenter components for locating on public/private cloud, with the networking being contained within the same OpenStack® instance. It is a challenge to connect OpenStack® deployments because quotas are not shared, networks are not shared and ranges and IP addresses can easily be repeated in different OpenStack® instances.

Returning to FIG. 1, a first virtual datacenter instance 105a and a second virtual datacenter instance 105b are connected to a first layer 2 network 115a, a third virtual datacenter instance 105c is connected to a second layer 2 network 115b, and a fourth virtual datacenter instance 105d and a fifth virtual datacenter instance 105e are connected to a third layer 2 network 115c. Although three layer 2 networks are shown in FIG. 1 for ease of illustration, alternatively two layer 2 networks or more than three layer 2 networks could host virtual datacenter instances. Layer 2 networks operate at the data link layer of the OSI model of computer networking.

In an example, the first to third layer 2 networks 115a to 115c are each Virtual Local Access Networks (VLANs). Each of the layer 2 networks 115a to 115c forms a broadcast domain, with messages broadcast by a network device connected to one of the layer 2 networks 115a to 115c being received by other network devices connected to that layer 2 network but not by layer 2 devices connected to the other layer 2 networks.

To enable communication between devices on different ones of the layer 2 networks 115a to 115c, an overlay layer 3 network 120 is provided. In an example, the overlay layer 3 network is a Virtual Extendible Local Area Network (VXLAN). The overlay layer 3 network 120 encapsulates a layer 2 message originating from a network device connected to one broadcast domain within a layer 3 message for transmission to a network device on another broadcast domain. The layer 3 message can then be transmitted over the overlay layer 3 network 120 to the layer 2 network hosting the destination network device, where the layer 3 message is processed to recover the original layer 2 message for transmission to the destination network device. Layer 3 networks operate at the network layer of the OSI model of computer networking.

An IP address manager 125 is connected to the overlay layer 3 network 120. Although the IP address manager 125 is shown connected directly to the overlay layer 3 network 120 in FIG. 3, alternatively the IP address manager may be connected to the overlay layer 3 network 120 via a layer 2 network. In an example, the IP address manager 125 operates in conformity with the Dynamic Host Configuration Protocol (DHCP) to assign IP addresses to network devices on the layer 2 networks 115*a* to 115*c* without IP address conflict, i.e. without two network devices being assigned the same IP address. In an example, the IP address manager is implemented by machine-readable instructions.

An orchestrator 130 is also connected to the overlay layer 3 network 120. Although the orchestrator 130 is shown connected directly to the overlay layer 3 network 120 in FIG. 3, alternatively the orchestrater 130 may be connected to the overlay layer 3 network 120 via a layer 2 network. The orchestrator 130 allows an administrator to configure a federated virtual datacenter by adding virtual datacenter instances and/or virtual machines. In this way, tenants on different virtual datacenter instances, for example Openstack® instances, can be presented to a user as part of a single virtual datacenter. In an example, the orchestrator 130 employs graphic techniques for ease of configuration. In an example, the orchestrator 130 is used to generate a Vapp, which is a configuration of virtual machines.

A software defined networking (SDN) controller 135 is also connected to the overlay layer 3 network 120. Again, although the SDN controller 135 is shown connected directly to the overlay layer 3 network 120 in FIG. 3, alternatively the SDN controller 135 may be connected to the overlay layer 3 network 120 via a layer 2 network. The SDN controller 120 programs routers and switches to implement the virtual networks used. In examples, the SDN controller 120 programs a VXLAN overlay to allow network traffic to be shared between multiple broadcast domains, for example VLANs, within a federated virtual datacenter.

Figure 2:
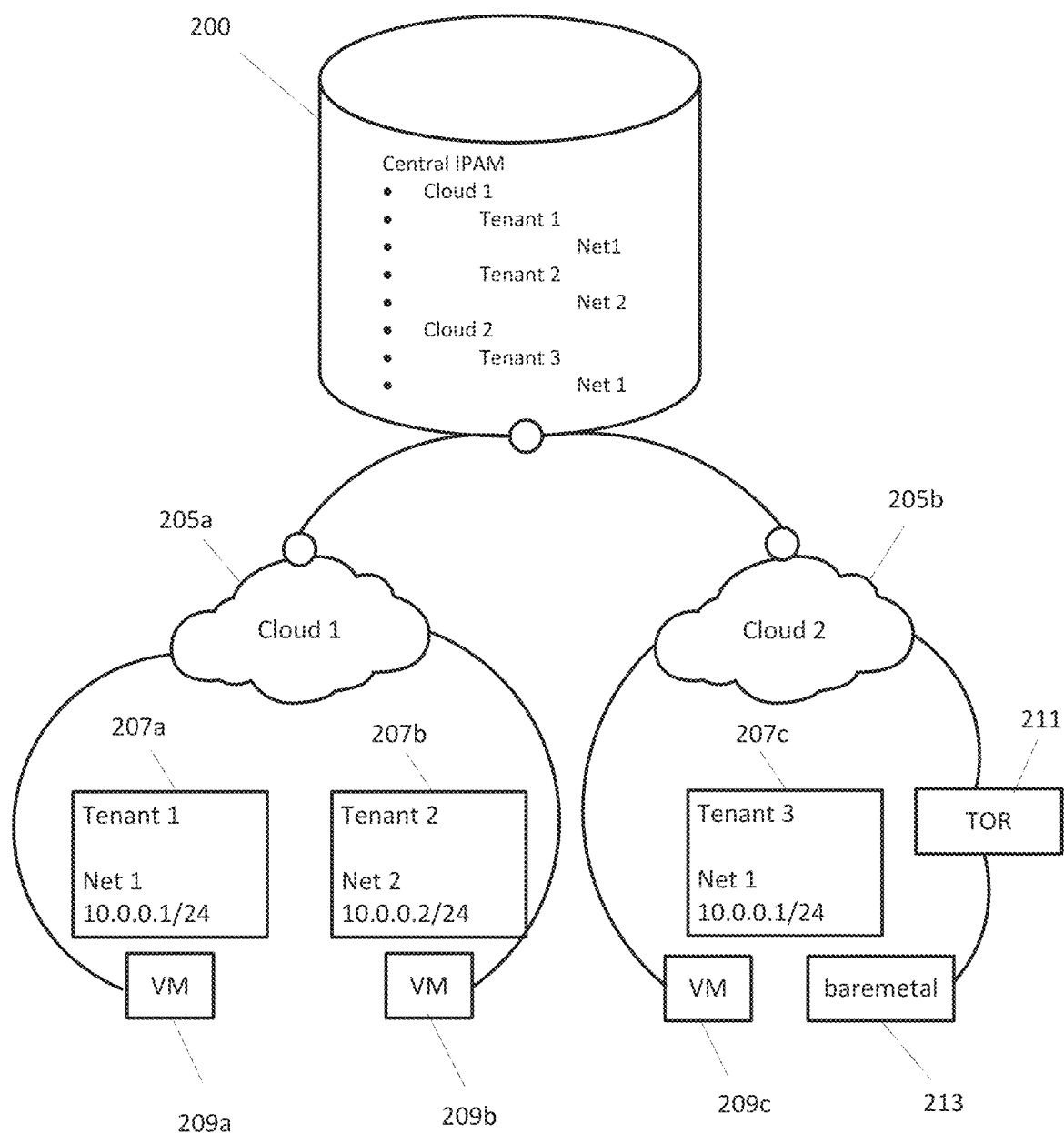
FIG. 2 schematically shows the operation of an IP address manager forming part of the federated datacenter illustrated in the example of FIG. 1.

FIG. 2 schematically shows the operation of the IP address manager 200 to federate tenants on different clouds 205*a* and 205*b* into a single virtual datacenter. As shown, a first tenant 207*a* and a second tenant 207*b* are accessed via a first cloud 205*a*, and a third tenant 207*c* is accessed via a second cloud 205*b*. The first tenant is formed on a first net (in this example 10.0.0.1/24) and has an associated first virtual machine 209*a*, the second tenant 207*b* is formed on a second net (in this example 10.0.0.2/24) and has an associated second virtual machine 209*b*, and the third tenant 207*c* is formed on the first net and has an associated third virtual machine 209*c*. Each of the first to third virtual machines is managed by hypervisor software associated with the operating system of the constituent network devices. A "baremetal" network device 213 (i.e. a network device with no operating system, is also accessed via the second cloud 205*b*.

The IP address manager 200 assigns IP addresses to the first to third virtual machines 209*a* to 209*c*, and also to the baremetal network device 213 via a Top-Of-Rack (TOR) switch 211.

In examples, virtual machines and baremetal network devices, for example bare metal servers, with direct access to physical ports by means of Peripheral Component Interconnect (PCI) passthrough and Single Root-Input/Output Virtualisation (SR-IOV) technologies can in effect be directly networked onto the layer 3 network. In such examples, the layer 3 messages are transmitted over the layer 2 network for receipt by such virtual machines and baremetal network devices. This allows level 2 and level 3 visibility within the same network of a virtual datacenter regardless of the number of virtual datacenter instances deployed and the network locations associated with those virtual datacenter instances.

Figure 3:
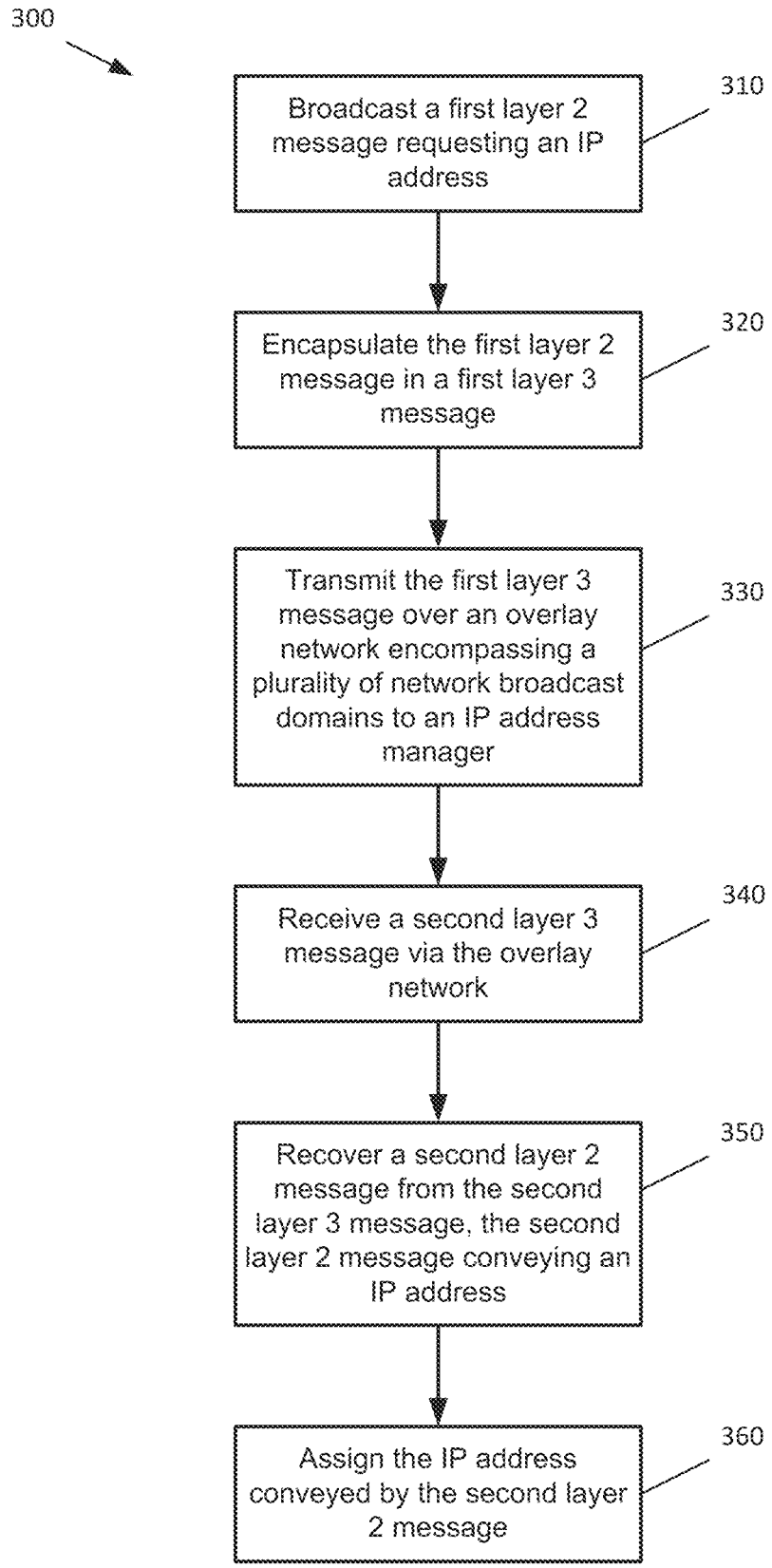
FIG. 3 is a flow chart showing operations performed by the federated virtual datacenter of an example.

Certain examples as discussed above provide a federated virtual datacenter having at least one of the following properties:
  Network federation at Layer 2 and Layer 3 of different clouds
  Network federation across different physical locations
  Coherent IP address assignment within a single Virtual Datacenter regardless how many clouds are used below as infrastructure
  No Classless Internet Domain Routing (CIDR) conflict within a single Virtual Datacenter regardless how many clouds are used below as infrastructure
  Coherent VLAN, and Vxlan assignment to provide L3 and L2 connectivity
  Data federation between clouds to unify application visibility
  Provide common management networks for all VMs deployed regardless the Virtual Datacenter but ensuring Virtual datacenter isolation FIG. 3 illustrates a flowchart showing an example of a method 300 for assigning IP addresses within a virtual datacenter instance. Although the execution of the method is described below with reference to the system of FIG. 2, the components for executing the method 300 may be spread among multiple devices.

As shown in FIG. 3, a first layer 2 message is broadcast, at 310, within a broadcast domain requesting an IP address. In this way, the first layer 2 message is checked by all network devices in the broadcast domain, including an interface to the overlay Layer 3 network. At the interface, the first layer 2 message is encapsulated, at 320, in a first layer 3 message, and the first layer 3 message is transmitted, at 330, over the overlay network, which encompasses a plurality of network broadcast domains, to the IP address manager.

The IP address manager reviews the first layer 2 message, assigns an IP address, avoiding any IP address conflict, and generates a second layer 2 message to convey the assigned IP address. The second layer 2 message is then encapsulated in a second layer 3 message for transmission over the overlay network.

The second layer 3 message is received, at 340, within the broadcast domain of the virtual datacenter instance via the overlay network. The second layer 2 message is recovered, at 350, from the second layer 3 message, the second layer 2 message conveying the assigned IP address. The IP address conveyed by the second layer 2 message is then assigned, at 360, within the virtual datacenter instance.

As discussed previously, in an example the overlay network is a VXLAN, and the broadcast domains correspond to VLANs, although other arrangements are possible.

In examples in which the IP address manager operates in conformity with DHCP, then the first and second layer 2 messages are DHCP messages as defined by DHCP.

Figure 4:
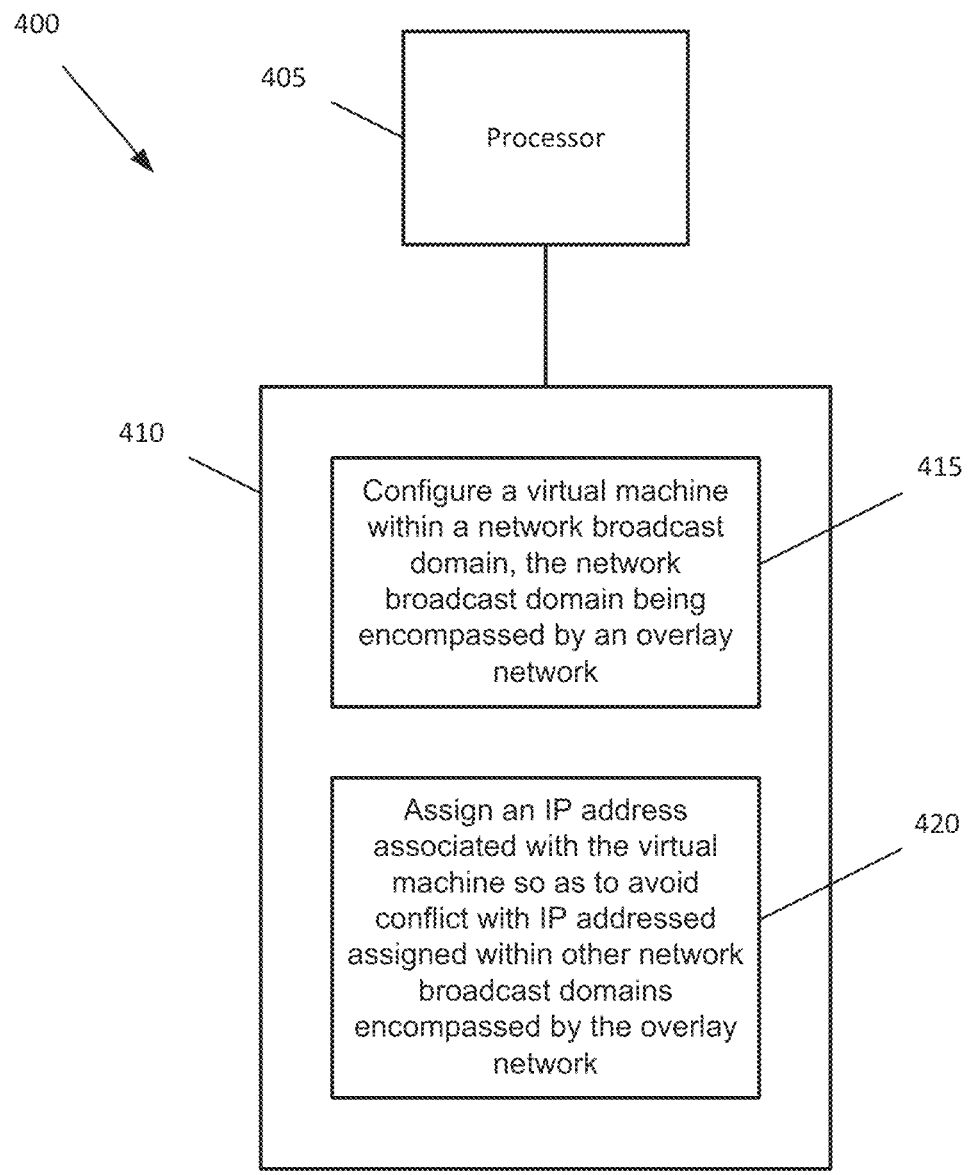
FIG. 4 is a schematic illustration showing a computer device for IP address management according to an example.

Certain system components and methods described herein may be implemented by way of non-transitory computer program code that is storable on a non-transitory storage medium. FIG. 4 shows an example of a system 400 comprising at least one processor 405 arranged to retrieve data from a computer readable storage medium 410. The computer-readable storage medium 410 comprises a set of computer-readable instructions stored thereon. The set of computer readable instructions are arranged to cause the at least one processing context to perform a series of actions. Instructions 415 are arranged to configure a virtual machine within a network broadcast domain, the network broadcast domain being encompassed by an overlay network. Instructions 420 are arranged to assign an IP address associated with the virtual machine so as to avoid conflict with IP addressed assigned within other network broadcast domains encompassed by the overlay network.

The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. Federated virtual datacenter apparatus comprising:
   at least two virtual datacenter instances in respective different network broadcast domains, wherein each virtual datacenter instance allows IP address repetition;
   an overlay network encompassing the respective different broadcast domains; and
   an Internet Protocol (IP) address manager to assign IP addresses to network devices associated with the plurality of virtual datacenter instances,
   wherein the IP address manager is arranged to assign non-conflicting IP between virtual datacenter instances.

2. Federated virtual datacenter apparatus according to claim 1, wherein the overlay network is arranged to encapsulate a layer 2 message in a layer 3 message for communication between different broadcast domains.

3. Federated virtual datacenter apparatus according to claim 2, wherein the overlay network is a Virtual Extensible Local Area Network (VXLAN).

4. Federated virtual datacenter apparatus according to claim 1, wherein the IP address manager is arranged to assign an IP address in accordance with the Dynamic Host Configuration Protocol (DHCP).

5. Federated virtual datacenter apparatus according to claim 1, wherein the apparatus is arranged to implement a vApp based network.

6. Federated virtual datacenter apparatus according to claim 1, wherein the apparatus comprises a software defined networking (SDN) controller.

7. Federated virtual datacenter apparatus according to claim 1, further comprising a plurality of hypervisors, each hypervisor to manage at least one virtual machine.

8. Federated virtual datacenter apparatus according to claim 1, wherein each virtual datacenter instance is an OpenStack® instance.

9. A method of assigning an Internet Protocol (IP) address within a virtual datacenter instance, the method comprising:
   broadcasting a first layer 2 message to all network devices in a broadcast domain requesting an IP address;
   encapsulating the first layer 2 message in a first layer 3 message;
   transmitting the first layer 3 message over an overlay network encompassing a plurality of network broadcast domains to an IP address manager;
   receiving a second layer 3 message via the overlay network;
   recovering a second layer 2 message from the second layer 3 message, the second layer 2 message conveying an IP address; and
   assigning the IP address conveyed by the second layer 2 message.

10. A method according to claim 9, wherein the overlay network is a Virtual Extensible Local Area Network (VXLAN).

11. A method according to claim 9, wherein the first layer 2 message is a broadcast layer 2 message.

12. A method according to claim 9, wherein the first layer 2 message and the second layer 2 message conform to the Dynamic Host Configuration Protocol (DHCP).

13. A method according to claim 9, wherein at least one virtual datacenter instance is associated with each of the plurality of network broadcast domains.

14. A method according to claim 9, wherein the virtual datacenter instance is an OpenStack® instance.

15. A non-transitory computer-readable medium comprising a set of computer-readable instructions stored thereon, which, when executed by a processor, cause the processor to:
   configure a virtual machine within a network broadcast domain comprising a plurality of virtual datacenter instances allowing IP address repetition, the network broadcast domain being encompassed by an overlay network; and
   assign a non-conflicting IP address associated with the virtual machine relative to IP addresses assigned within other network broadcast domains encompassed by the overlay network.

16. The non-transitory computer-readable medium of claim 15, wherein the set of computer-readable instructions, which when executed further cause the processor to encapsulate a layer 2 message in a layer 3 message for communication between the network broadcast domain and the other network broadcast domains.

17. The non-transitory computer-readable medium of claim 15, wherein the overlay network is a Virtual Extensible Local Area Network (VXLAN).

18. The non-transitory computer-readable medium of claim 15, wherein the set of computer-readable instructions, which when executed causes the processor to assign an IP address, assigns the IP address in accordance with the Dynamic Host Configuration Protocol (DHCP).

* * * * *